United States Patent [19]

Braun

[11] Patent Number: 5,040,189
[45] Date of Patent: Aug. 13, 1991

[54] MULTIPLE FREQUENCY RADIO SYSTEM EMPLOYING PULSE REPEATERS

[75] Inventor: William V. Braun, Pompano Beach, Fla.

[73] Assignee: Motorola, Inc., Schaumburg, Ill.

[21] Appl. No.: 322,279

[22] PCT Filed: Jan. 12, 1987

[86] PCT No.: PCT/US87/00024
§ 371 Date: Aug. 15, 1988
§ 102(e) Date: Aug. 15, 1988

[87] PCT Pub. No.: WO88/05231
PCT Pub. Date: Jul. 14, 1988

[51] Int. Cl.$^5$ .............................................. H04B 3/36
[52] U.S. Cl. ........................................... 375/3; 375/4; 375/7; 455/7; 455/77; 380/32
[58] Field of Search ................. 375/4, 7, 3, 1; 455/17, 455/20, 22, 77, 78, 7, 21, 1; 370/75; 342/15, 112, 129, 131, 132; 380/31, 32, 33, 34, 38

[56] References Cited

U.S. PATENT DOCUMENTS

| | | | |
|---|---|---|---|
| 2,666,845 | 1/1954 | Colton et al. | 455/15 |
| 3,487,310 | 12/1969 | Bateman et al. | 455/15 X |
| 3,825,829 | 7/1974 | Braun | 375/4 |
| 4,347,625 | 8/1982 | Williams | 455/17 |
| 4,361,886 | 10/1982 | Gutleber | 370/15 X |
| 4,394,775 | 7/1983 | Bruinsam | 455/17 |
| 4,442,527 | 4/1984 | Munday | 380/34 X |
| 4,451,916 | 5/1984 | Casper et al. | 375/4 |
| 4,606,040 | 8/1986 | David et al. | 380/34 |

Primary Examiner—Benedict V. Safourek
Assistant Examiner—Tesfaldet Bocure
Attorney, Agent, or Firm—Daniel K. Nichols; Michael J. Buchenhorner

[57] ABSTRACT

The pulse communication system includes a plurality of pulse repeaters 10 for receiving and transmitting pulse signals. Each of the pulse repeaters include a frequency controller 22 for selecting one of a sequence of transmit and receive frequencies. The frequency controller 22 causes the transmit and receive frequency to change after the reception of each pulse in order to receive and transmit the next pulse on another frequency.

4 Claims, 6 Drawing Sheets

MULTIPLE FREQUENCY RADIO SYSTEM EMPLOYING PULSE REPEATERS

BACKGROUND OF THE INVENTION

This invention relates to a radio system employing pulse repeaters in general and particularly to a multiple frequency radio system utilizing pulse repeaters which are capable of operating on more than one frequency. A radio system employing pulse repeaters is disclosed in U.S. Pat. No. 3,825,829 issued to the inventor of the present invention. This prior patent discloses a system for propagating pulses through a field of pulse repeaters. After propagating a pulse, each repeater is blanked for an interval during which time it can not repeat additional pulses, thereby preventing self sustaining oscillation of the system. The effective bit rate of the prior art system is limited by this blanking interval, which is determined by the maximum propagation delay in any particular system implementation.

SUMMARY OF THE INVENTION

This radio system employing pulse repeaters is capable of repeating pulses on a plurality of frequencies thereby providing increased bit rate of operation and system throughput as compared to a single frequency system.

The pulse communication system includes a plurality of pulse repeaters for receiving and transmitting pulse signals in a chain reaction fashion. Each repeater includes frequency control means for selecting one of a sequence of transmit and receive frequencies. The frequency control means changes the transmit and receive frequency after the reception of a pulse in order to receive and transmit the next pulse on another frequency.

In one aspect of the invention a pulse repeater includes receiving means for receiving pulse signals. Detecting means are connected to the receiving means for detecting the presence of a pulse signal. Transmitting means is responsive to the detecting means for transmitting a pulse signal upon detection of the pulse signal. A frequency control means selects one of a series of operating frequencies so that each pulse is received and transmitted on a frequency differing from that of the previous pulse.

In another aspect of the invention a pulse transceiver is provided for receiving and transmitting pulse signals. A frequency control means changes the transmit frequency after the transmission of each pulse and the receive frequency after the receiption of each pulse.

DESCRIPTION OF THE PREFERRED EMBODIMENT

The basic operation of a radio system utilizing pulse repeaters, including operation of the repeaters and portable units (transceivers), is described in U.S. Pat. No. 3,825,829 the disclosure of which is hereby incorporated by reference as if fully set out herein. The operation of the present system which repeats pulses on a plurality of frequencies, comprising a series or sequence, for providing increased system bit rate and throughput is described below.

Figure 1:
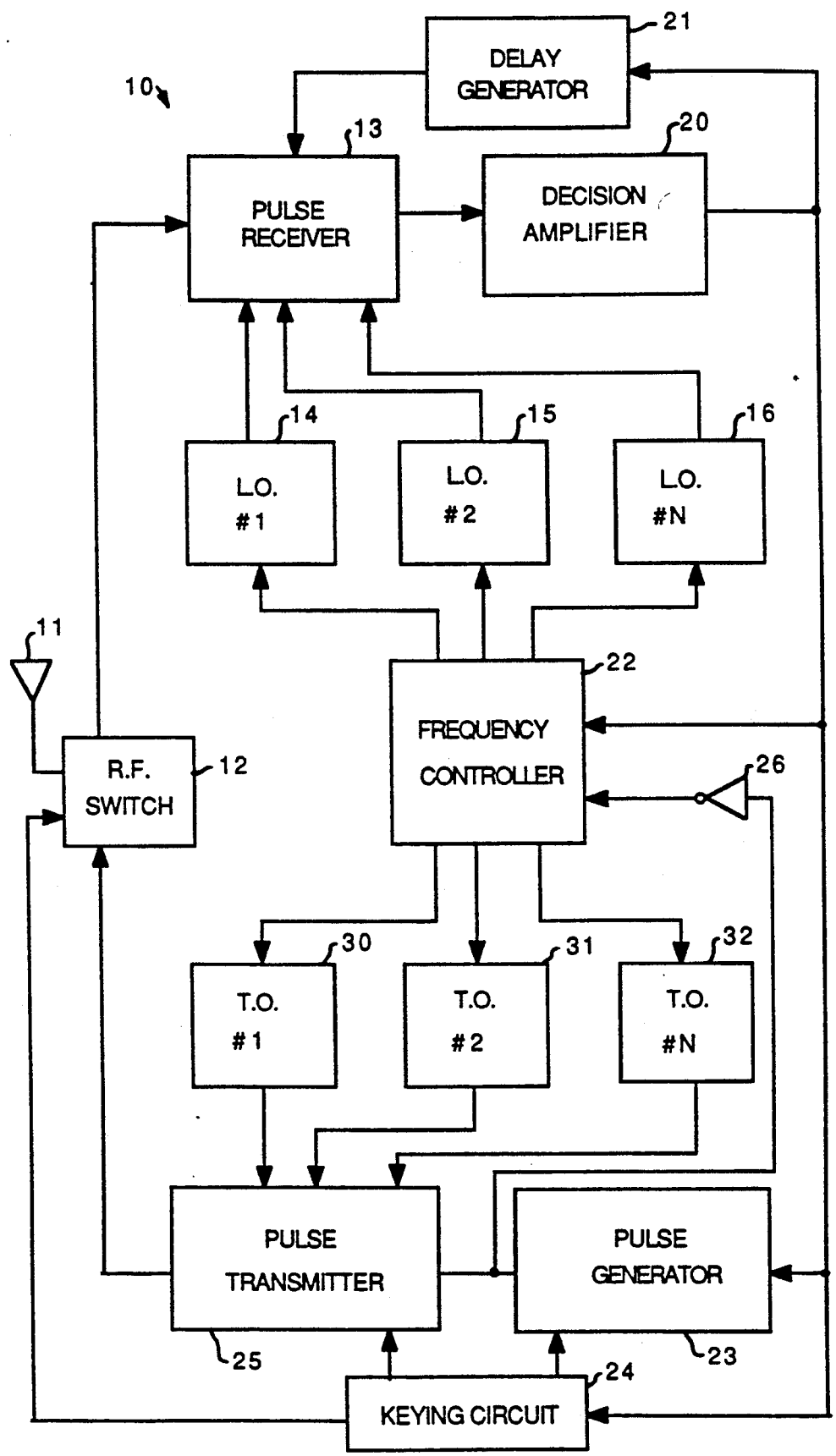
FIG. 1 is a functional block diagram of a repeater for use in a system according to the invention.

Referring now by characters of references to the drawings and first to FIG. 1, it will be understood that a repeater 10 includes an antenna 11 connected to an RF switch 12 which functions as a transmit receive switch for switching the antenna between receiver and transmitter portions of the repeater. The receiver output of RF switch 12 is connected to a pulse receiver 13, comprising receiving means, that has its frequency selectively controlled by a series of local oscillators namely, L.O. #1, L.O. #2, and L.O. #N designated as 14, 15 and 16 respectively. Each of the local oscillators 14–16 provides a different frequency to pulse receiver 13 for selecting the receiver frequency. The number of local oscillators utilized depends on the number of frequencies of operation of the repeater 10 and includes at least 2 local oscillators for operation on at least two frequencies. Rather than using individual local oscillators, other approaches for providing the local oscillator signals, such as using a frequency synthesizer can be utilized as is well known in the art.

Figure 7:
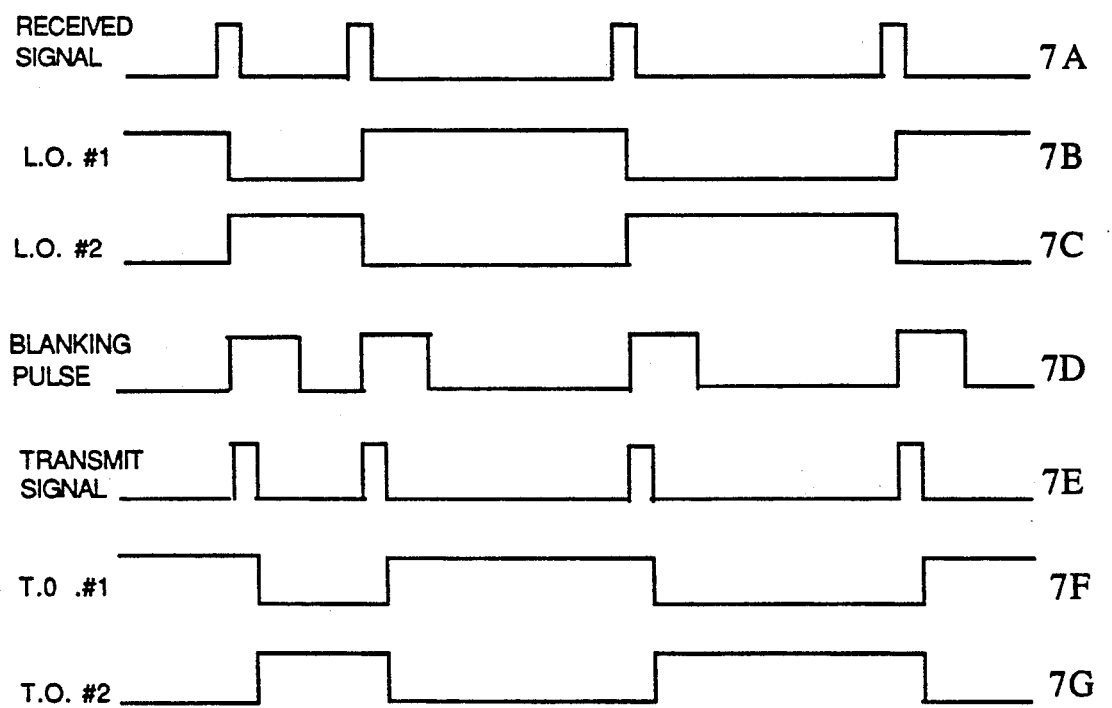
FIGS. 7A through 7G shows various timing diagrams of the repeater of FIG. 1 for two frequency operation.

The output of pulse receiver 13 goes to decision amplifier 20, comprising detecting means, which is used for determining when a pulse has been received. When a pulse is received, as indicated by the high signals of FIG. 7A, decision amplifier 20 provides an output pulse to actuate a delay generator 21, a frequency controller 22, a pulse generator 23 and a keying circuit 24. Delay generator 21 provides an output signal, as shown in FIG. 7D, used for blanking the pulse receiver 13 while a pulse is being transmitted. The frequency controller 22, comprising frequency control means, is used for selecting the local oscillators 14–16 that determine the receive frequency of the repeater. The pulse generator 23 provides the pulse signal of FIG. 7E for transmission. Keying circuit 24 is used for actuating the RF switch 12 to switch the antenna 11 to the transmitter portion of repeater 10 and for activating pulse transmitter 25, comprising transmitting means, to transmit the pulse to antenna 11 via switch 12.

The pulse output of the pulse generator 23 is also provided to inverter 26 which is connected to the frequency controller 22 for actuating the frequency controller on the low going edge of the pulse. Transmit oscillators T.O. #1, T.O. #2, and T.O. #3, 30–32 respectively are connected to the frequency controller 22 and pulse transmitter 25. Transmit oscillators 30–32 are used for determining the transmit frequency of the transmitter pulse. The transmit oscillators 30–32 provide transmit frequencies corresponding to the receive frequencies determined by local oscillators 14–16. The numbers of transmit oscillators is determined by number of frequencies of operation of repeater 10. If desired, a frequency synthesizer or other conventional approach could be utilized for generating the transmit oscillator frequencies.

Figure 2:
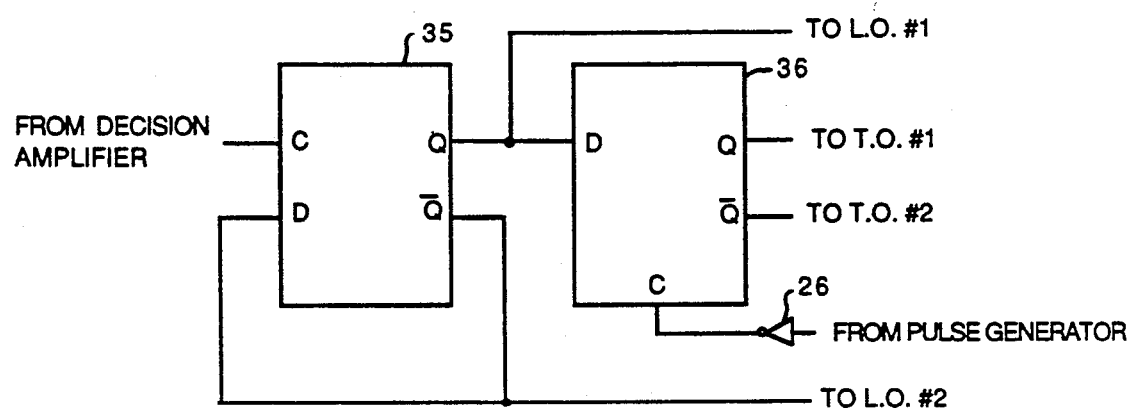
FIG. 2 is an electrical schematic diagram of a frequency controller for use in the repeater of FIG. 1 for two frequency operation.

Referring now to FIG. 2, a circuit for use as a frequency controller 22 for two frequencies of operation of repeater 10 is shown. It will be understood that for two frequencies of operation, only local oscillators 14 and 15 and transmit oscillators 30 and 31 are utilized. The output of decision amplifier 20 is connected to a C (clock) input of a D flip-flop 35 that has its D input connected to its Q bar output for providing a toggle operation. The Q output of flip-flop 35 is connected to the local oscillator 14 while the Q bar output is connected to the local oscillator 15. The Q and Q bar outputs of flip-flop 35 are represented by the waveforms of FIGS. 7B and 7C respectively. These waveforms also represent the operating state of the two local oscillators 14 and 15. The local oscillator 14 or 15 associated with the high output of the flip-flop 35 is actuated on for determining the receive frequency of the pulse receiver 13.

The Q output of flip-flop 35 is also connected to the D input of a second D flip-flop 36 that has its Q output connected to transmit oscillator 39 and its Q Bar output connected to transmit oscillator 31. Its clock input is connected via the inverter 26 to the output of pulse generator 23. The Q and Q bar outputs of flip-flop 36 are represented by the waveforms of FIGS. 7F and 7G respectively. These waveforms also represent the operating state of the two transmit oscillators 30 and 31.

It will be understood that until a pulse is received by pulse receiver 13, as indicated by an output pulse from decision amplifier 20, the outputs of flip-flops 35 and 36 will be the same, that is, the Q outputs of both will be equal and the Q bar outputs of both will be equal so that the transmit pulse receiver 13 and the pulse transmitter 25 are on the same frequencies. When a pulse is received, the output pulse from decision amplifier 20 is applied to the C input of flip-flop 35 causing flip-flop 35 to toggle or reverse its outputs. Flip-flop 36 is not affected since it is not clocked as of this time. The pulse generator 23 first generates a pulse which is transmitted. The low going edge of the pulse from pulse generator 23, which appears as a high going edge from inverter 26, clocks flip-flop 36 and causes its output to assume the same state as of the output of flip-flop 35.

Figure 3:
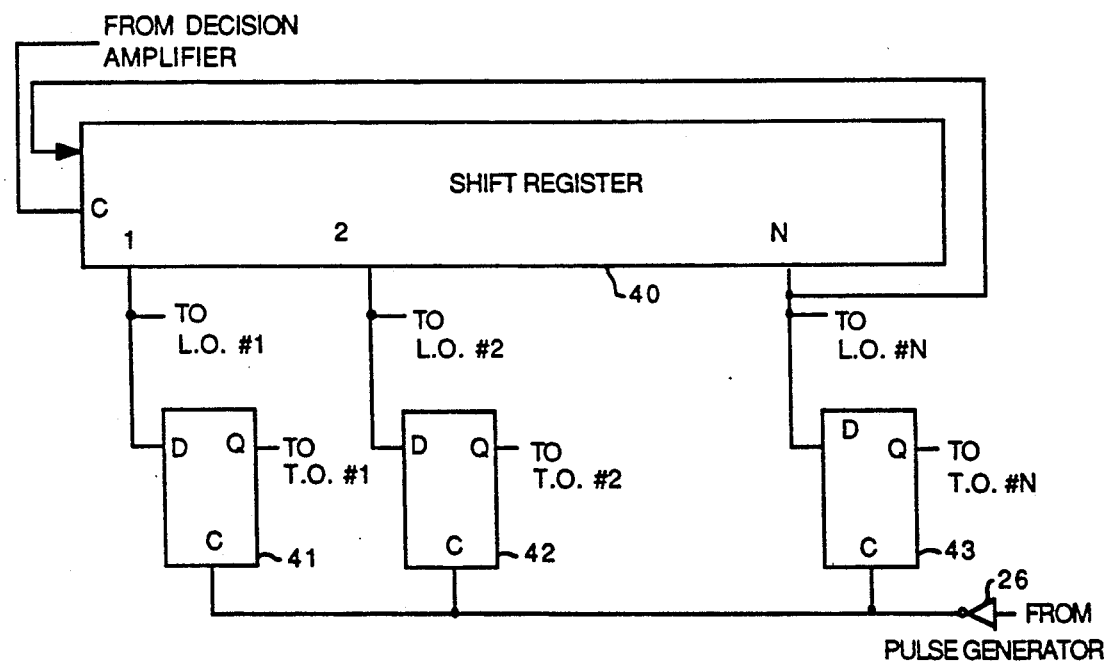
FIG. 3 is an electrical schematic diagram of a frequency controller for use in the pulse repeater of FIG. 1 for multiple frequency operation.

While the frequency controller circuit of FIG. 2 is particularly useful for a two frequency pulse repeater, for three or more frequency of operations a different arrangement such as that illustrated in FIG. 3 must be utilized. The frequency controller circuit of FIG. 3 includes a shift register 40 having a number of outputs equal to N corresponding to the number of frequencies of operation of the repeater 10. A single high output is shifted through the shift register, from output to output so that the next successive output goes high on each clock pulse from decision amplifier 20. The first output of shift register 40 is connected to local oscillator 14, the second output connected to local oscillator 2 and successive outputs up to N are connected to associated local oscillators such as local oscillator 16.

Each output of shift register 40 is also connected to a D input of an associated D flip-flop. In this case, flip-flop 41 is connected to output 1, flip-flop 42 is connected to output 2, and flip-flop 43 is connected to output N. The Q output of the flip-flops 41–43 are each connected to associated transmit oscillators, 30–32 respectively. The clock inputs of flip-flops 41–43 are tied together and are connected to the output of the inverter 26.

When a pulse is received, the output of decision amplifier 20 goes high and clocks the shift register, shifting the high output one position and changing the selected receiver local oscillator and, therefor, the receive frequency. The selected transmit oscillator is not changed until after the transmitter pulse is sent since the clock inputs of the D flip-flops 41–43 are all controlled by the output of the pulse generator 23 through inverter 26. Once flip-flops 41–43 have been clocked, an associated pair of local and transmit oscillators are again selected thereby selecting the same receive and transmit frequency for repeater 10.

Figure 4:
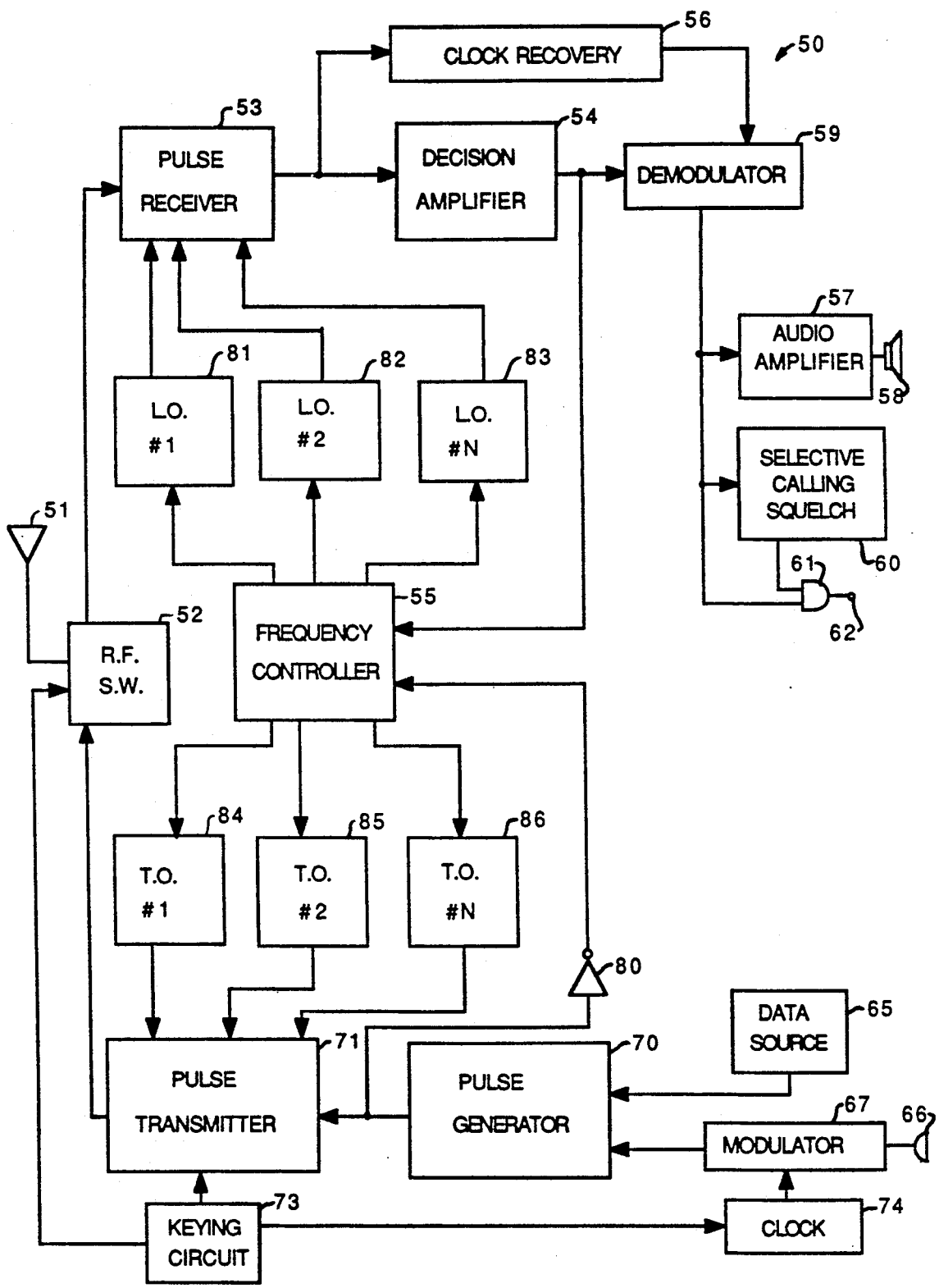
FIG. 4 is a block diagram of a transceiver for use with the communication system according to the invention.

A pulse transceiver 50 is illustrated in FIG. 4. The pulse transceiver 50 includes a number of parts which are similar or indentical to those of pulse repeater 10. An antenna 51 is selectively switched between transmitter and receiver portions of the transceiver 50 via RF switch 52. Received signals from antenna 51 are applied to a pulse receiver 53, constituting receiving means, that has its output connected to decision amplifier 54, comprising detecting means. The output of decision amplifier 54 is provided to a frequency controller 55, comprising frequency control means, and to a demodulator 59. A clock recovery circuit 56 has its input connected to the output of pulse receiver 53 and its output connected to demodulator 59.

The output of demodulator 59 is applied to amplifier 57, selective calling squelch circuit 60, and AND gate 61. The other input of AND gate 61 is connected to the output of selective calling squelch circuit 60. Output 62 of AND gate 61 is the data output line of transceiver 50. The audio output of transceiver 50 is provided by speaker 58 connected to audio amplifier 57.

Data to be transmitted by transceiver 50 can be provided to a pulse generator 70 from a data source 65 or from a microphone 66 via modulator 67. The output of pulse generator 70 is connected to pulse transmitter 71, comprising transmitting means, which is connected to the RF switch 52. Keying circuit 73 is actuated as by a push-to-talk switch (not shown). The keying circuit 73 actuates the RF switch 52, pulse transmitter 70, as well as clock circuit 74. The output of clock 74 is applied to modulator 67 for use in converting audio from microphone 66 to a pulse signal.

The output of pulse generator 70 is also applied, through inverter 80, to frequency controller 55. As with repeater 10, frequency controller 55 has outputs connected to local oscillators 1, 2 and N, 82–83 respectively and to transmit oscillators numbers 1, 2 and N, 84–86 respectively. Frequency controller 55 controls the selection of both the receiver and transmitter oscillators to control the receive and transmit frequencies of the transceiver.

Figure 5:
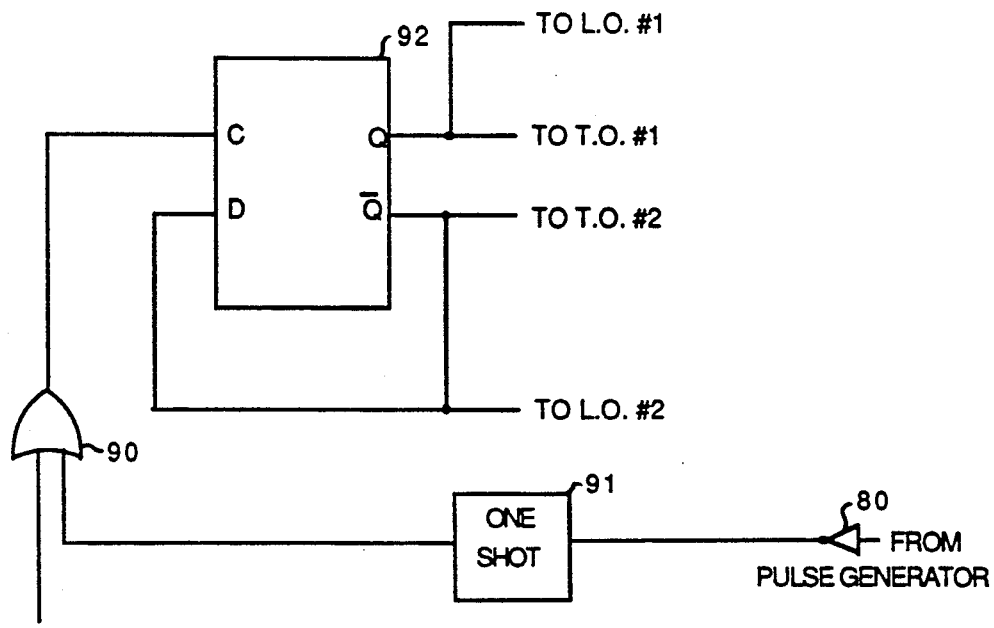
FIG. 5 is an electrical schematic diagram of a frequency controller for use in the repeater of FIG. 5 for two frequency operation.

A circuit for a frequency controller 55 for two frequencies of operation is illustrated in FIG. 5. This frequency controller includes an OR gate 90 that has one input connected to the output of decision amplifier 54. The output of inverter 80 is connected to a one shot circuit 91 that provides a single pulse output for each high going pulse supplied at its input. Its output is connected to the other input of OR gate 90. The output of OR gate 90 is connected to a C input of a D flip-flop 92.

This D flip-flop is arranged for toggle operation by having its Q bar output tied back to its D input. The Q output of flip-flop 92 actuates both the local oscillator 81 and transmit oscillator 84. The Q bar output of flip-flop 92 actuates both the local oscillator 82 and transmit oscillator 85.

During reception, when a pulse is received, decision amplifier 54 provides a pulse to OR gate 90 which clocks flip-flop 92 causing it to toggle and its output is switched to switch receive frequencies. When transmitting, on the low going edge of each pulse from pulse generator 70, inverter 80 provides a high going edge to one shot 91, which provides a pulse to OR gate 90, clocking flip-flop 92 to change operating frequency of the transceiver.

Figure 6:
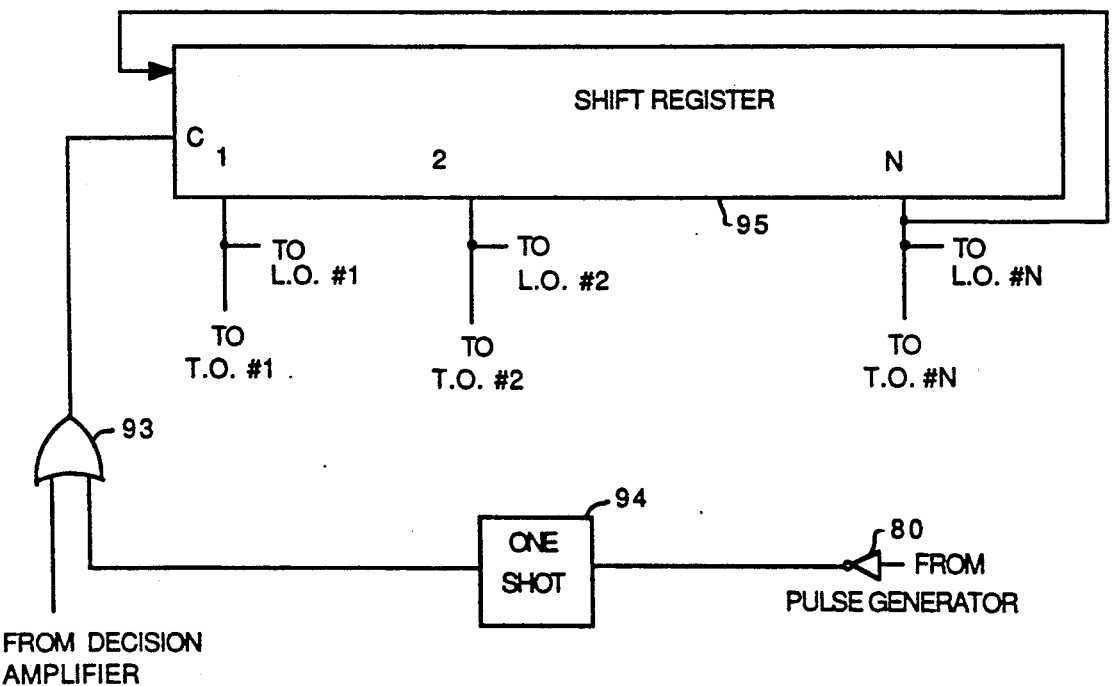
FIG. 6 is an electrical schematic diagram of a frequency controller for use in the transceiver of FIG. 4 for multiple frequency operation.

For more than two frequencies of operation, a different circuit for frequency controller 55 must be utilized. FIG. 6 illustrates a circuit capable of operating on multiple or N frequencies where N is an integer greater than one. As illustrated, the output from decision amplifier 54 is applied to one input of an OR gate 93. The output of inverter 80 is applied via one shot circuit 94 to the other input of OR gate 93. The output of OR gate 93 is provided to a clock input C of a shift register 95. Like the shift register 40 of repeater 10, shift register 95 is utilized for propagating a single high output for controlling the N transmit and receive oscillators. Its first output is connected to local oscillator 81 and transmit oscillator 84, its second output is connected to local oscillator 82 and transmit oscillator 85 and its N output is connected to local oscillator 83 and transmit oscillator 86.

In operation, when the first output of shift register 95 is high and a clock pulse is received, the first output goes low and the second output goes high. The high output of shift register 95 shifts one position on each successive clock pulse that is received and on the low going edge of every transmitted pulse. The N output of shift register 95 is tied back to its input so as to cause the single high output to be recirculated through the shift register. After each transmitted or received pulse the frequency of operation of transceiver 50 is shifted.

Figure 8:
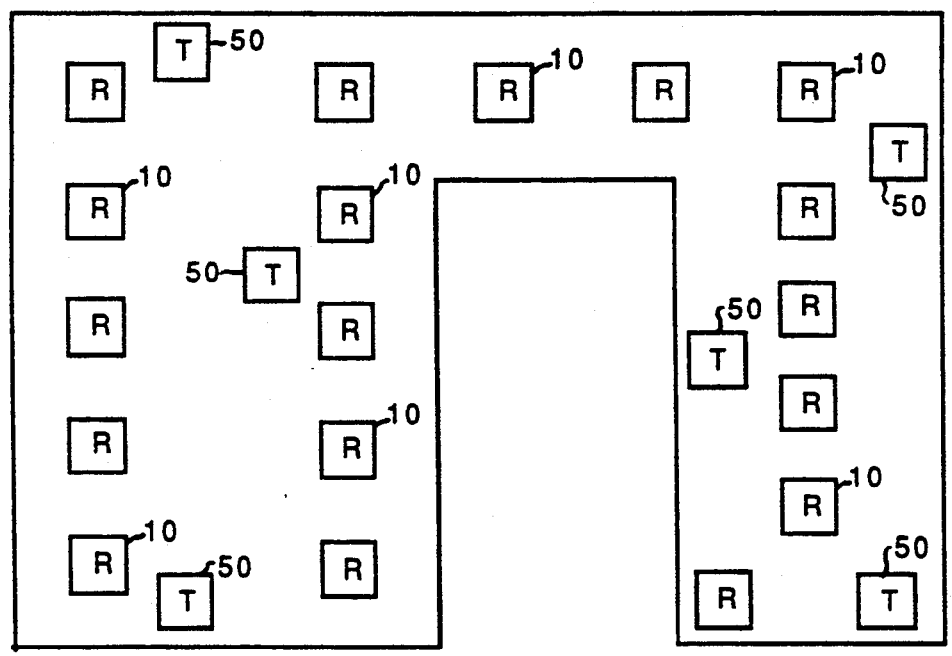
FIG. 8 is a block diagram of a typical radio system according to the present invention.

Referring now to FIG. 8, a typical application of the pulse repeaters 10 and pulse transceivers 50 is illustrated. As shown, a plurality of pulse repeaters 10 are distributed in order to provide coverage in a system coverage area. Individual transceivers 50 are positioned where desired so as to be able to transmit and receive information in the system.

In operation, one of the transceivers 50 introduces a pulse on a first frequency into the system. This pulse is picked up by one or more of the closest repeaters 10 and retransmitted by it on the same frequency for propagation through the field of repeaters 10. After transmission of the pulse by the transceiver 50 it switches to the next frequency as does each of the repeaters 10 after repeating the pulse. The transceiver 50 can then introduce a second pulse into the system on the second frequency while the first pulse is still being repeated through the other repeaters 10 remote from transceiver 50. It will be appreciated that utilization of multiple frequencies permits the propagation of multiple pulses in the system simultaneously. For example, if three frequencies are utilized, repeaters farthest from the originating transceiver 50 can be repeating the first pulse on the first frequency while repeaters at intermediate locations may be repeating pulses on the second frequency and the transmitter 50 and repeaters 10 in its vicinity may be operating on the third frequency. As such, the system can offer substantially throughput advantages over systems utilizing a single frequency.

While the system of the preferred embodiment is configured as a radio system, ultrasonic, infrared or light pulses could also be utilized.

I claim as my invention:

1. A pulse communication system comprising:
a plurality of pulse repeaters for receiving and transmitting pulse signals, each of the repeaters including frequency control means for selecting one of a sequence of transmit and receive frequencies of the repeater, the frequency control means changing the transmit and receive frequency in response to the reception of any pulse in order to receive and transmit the next pulse on another frequency.

2. A pulse repeater comprising:
receiving means for receiving pulse signals,
detecting means connected to the receiving means for detecting the presence of a pulse signal,
transmitting means connected to said detecting means and responsive thereto for transmitting a pulse signal upon detection of the pulse signal, and
frequency control means operatively selecting one of a sequence of operating frequencies of the receiving and transmitting means, the frequency control means selecting the operating frequency of the transmitting means to transmit each received pulse on the frequency on which it is received and selecting a different receive frequency in response to the reception of each pulse.

3. A pulse transceiver comprising:
receiving means for receiving pulse signals,
transmitting means for transmitting pulse signals, and
frequency control means for selecting the operating frequency of the receiving and transmitting means, the frequency control means changing the operating frequency of the receiving means in response to the reception of each pulse and changing the operating frequency of the transmitting means after the transmission of each pulse.

4. A pulse transceiver comprising:
receiving means for receiving pulse signals,
transmitting means for transmitting pulse signals, and
frequency control means for selecting the operation frequency of the receiving and transmitting means, the frequency control means changing the operating frequency of both, the transmitting and receiving means in response to the reception of each pulse and after the transmission of each pulse.

* * * * *